(12) United States Patent
Qu et al.

(10) Patent No.: US 9,537,666 B2
(45) Date of Patent: Jan. 3, 2017

(54) NUMBER ASSOCIATION REALIZING METHOD AND SYSTEM

(71) Applicant: ZTE Corporation, Shenzhen, Guangdong (CN)

(72) Inventors: Xiaoming Qu, Shenzhen (CN); Yongsheng Miao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 57 days.

(21) Appl. No.: 14/420,808

(22) PCT Filed: Sep. 22, 2013

(86) PCT No.: PCT/CN2013/083942
§ 371 (c)(1),
(2) Date: Feb. 10, 2015

(87) PCT Pub. No.: WO2014/044213
PCT Pub. Date: Mar. 27, 2014

(65) Prior Publication Data
US 2015/0222441 A1 Aug. 6, 2015

(30) Foreign Application Priority Data
Sep. 20, 2012 (CN) .......................... 2012 1 0351630

(51) Int. Cl.
*H04W 4/00* (2009.01)
*H04L 12/14* (2006.01)
(Continued)

(52) U.S. Cl.
CPC ......... *H04L 12/1403* (2013.01); *H04L 65/105* (2013.01); *H04L 65/1006* (2013.01);
(Continued)

(58) Field of Classification Search
CPC combination set(s) only.
See application file for complete search history.

(56) References Cited

U.S. PATENT DOCUMENTS 7,116,967 B2 * 10/2006 Kauppinen ........... H04M 7/006
455/404.1
2006/0056394 A1 3/2006 Kuure
(Continued)

FOREIGN PATENT DOCUMENTS

CN 101175084 A 5/2008
CN 101222378 A 7/2008
(Continued)

OTHER PUBLICATIONS

International Search Report in international application No. PCT/CN2013/083942, mailed on Dec. 26, 2013.
(Continued)

*Primary Examiner* — Frank Duong
(74) *Attorney, Agent, or Firm* — Oppedahl Patent Law Firm LLC

(57) ABSTRACT

A method and system for realizing number association are provided. The method includes that a Proxy Call Session Control Function (P-CSCF) acquires number information of A user; the P-CSCF parses and stores the number information to realize number association. With the method that a P-CSCF acquires number information of A user, and then parses and stores the number information, number association is realized, wherein the format of the number may be either SIP or TEL. The method and system can simplify and optimize service processing, thus improving efficiency and reducing cost.

4 Claims, 4 Drawing Sheets

(51) Int. Cl.
*H04W 8/26* (2009.01)
*H04L 29/06* (2006.01)
*H04W 4/16* (2009.01)
*H04L 29/12* (2006.01)

(52) U.S. Cl.
CPC ........... *H04L 65/1016* (2013.01); *H04W 4/16* (2013.01); *H04W 8/26* (2013.01); *H04L 61/308* (2013.01); *H04L 61/3085* (2013.01)

(56) References Cited

U.S. PATENT DOCUMENTS

| | | | |
|---|---|---|---|
| 2008/0194258 A1 | 8/2008 | Chiu | |
| 2009/0253431 A1* | 10/2009 | Shi | H04L 29/12188 455/435.1 |
| 2010/0325275 A1 | 12/2010 | Van Elburg | |
| 2011/0038319 A1 | 2/2011 | Shi | |
| 2011/0310774 A1* | 12/2011 | Yang | H04L 65/40 370/259 |
| 2011/0314169 A1 | 12/2011 | Van Elburg | |
| 2012/0158964 A1 | 6/2012 | Van Elburg | |
| 2013/0286944 A1* | 10/2013 | Siegel | H04L 65/1016 370/328 |

FOREIGN PATENT DOCUMENTS

| | | |
|---|---|---|
| CN | 101742362 A | 6/2010 |
| CN | 101771693 A | 7/2010 |
| CN | 102025695 A | 4/2011 |
| CN | 102868986 A | 1/2013 |
| EP | 2400715 A1 | 12/2011 |
| WO | 2012085429 A2 | 6/2012 |

OTHER PUBLICATIONS

English Translation of the Written Opinion of the International Search Authority in international application No. PCT/CN2013/083942, mailed on Dec. 26, 2013.

Supplementary European Search Report in European application No. 13839122.2, mailed on Jul. 2, 2015.

* cited by examiner (PRIOR ART)

NUMBER ASSOCIATION REALIZING METHOD AND SYSTEM

TECHNICAL FIELD

The disclosure relates to the technical field of wireless communications, and in particular to a method and system for realizing number association.

BACKGROUND

The IP Multimedia Subsystem (IMS) is a standard defined by the 3rd Generation Partnership Project (3GPP) for the next-generation network, and its distinguishing features are that the Session Initiation Protocol (SIP) system is adopted, communication is unrelated to access, and multiple capabilities, such as separation between a multimedia service control function and a bearing capacity, separation between a call and a session, separation between an application and a service, separation between a service and a network, and service convergence of a mobile network and Internet, can be provided.

The presentation of IMS complies with the trend of integrative development of a communication network; a network architecture of the IMS is shown in FIG. 1, including: a piece of User Equipment (UE)/access equipment, a Proxy Call Session Control Function (P-CSCF), an Interrogating Call Session Control Function (I-CSCF), a Serving Call Session Control Function (S-CSCF), a Home User Server (HSS) and an Application Server (AS) which is not shown in FIG. 1.

A Public User Identity (PUI) is an identity for a user to communicate in the IMS network. For meeting requirements of some service applications in specific scenarios, a concept of alias group is introduced into the IMS, wherein the alias group is information about which specific numbers of a user are aliases to each other, for example, PUI 1 and PUI 2 are aliases to each other, namely PUI 1 and PUI 2 represent the same user.

A Uniform Resource Identifier (URI) in the same alias group has the following features: belonging to the same implicit registration assembly, subscribing the same service, and having completely same configuration in each service scenario.

In an IMS architecture, an S-CSCF can acquire alias group information by acquiring user data information from an HSS; the specific flow is shown in FIG. 2, including the following steps:

S201: UE sends a registration request to an P-CSCF, wherein the registration request carries a PUI;

S202: when receiving the registration request, the P-CSCF locates local user data; the P-CSCF finds an I-CSCF through a Domain Name System (DNS) or other ways, and forwards the registration request to the I-CSCF;

S203: the I-CSCF sends an S-CSCF assignment request (UAR) to the HSS to require assigning the S-CSCF;

S204: the HSS returns an S-CSCF assignment answer (UAA) to the I-CSCF, wherein the S-CSCF assignment answer includes an S-CSCF address/name assigned to the user, and user data including alias group information of the user;

S205: the I-CSCF sends a registration request message to the selected S-CSCF;

S206: the S-CSCF sends a user data acquisition request (SAR) to the HSS to acquire the user data;

S207: the HSS returns a user data acquisition answer (SAA) carrying the user data, wherein the user data includes the alias group information of the user;

S208: the S-CSCF processes correspondingly, and returns a registration success response, like 200OK, to the I-CSCF, wherein the response includes PUI information; at the same time, the alias group information of the user is stored locally;

S209: the I-CSCF forwards the registration success response to the P-CSCF;

S210: after receiving a registration response message, the P-CSCF stores the user data locally, that is, storing the PUI information locally; and

S211: the P-CSCF forwards the registration success response to the UE.

Through the alias group technology, the S-CSCF can associate different numbers. For example, PUI 1 and PUI 2 are associated numbers to each other, wherein PUI 1 is sip: +861013813812345@bj.com.cn; PUI 2 is tel: +861013813812345. For some functions, it is required to use associated numbers. By taking a monitor function for example, it is supposed the PUI 1 is monitored, then, since PUI 1 and PUI 2 have the same number service and the same nature, it is necessary to monitor PUI 1 and PUI 2 simultaneously for preventing missing monitoring. For the S-CSCF, the alias group technology can solve the number association problem and realize simultaneous monitoring of PUI 1 and PUI 2.

At present, the P-CSCF has neither number association information nor alias group information. When some functions, such as a monitoring function, are implemented on the P-CSCF, it is needed to monitor all number forms of a user in order to efficiently prevent missing, which is complicated to operate and costs too much.

SUMMARY

In view of this, the disclosure provides a method and system for realizing number association, which can realize user number association based on a P-CSCF.

To this end, a technical solution of the disclosure is implemented as follows.

A method for realizing number association includes that:

a P-CSCF acquires number information of a user; and the P-CSCF parses and stores the number information to realize number association.

In an embodiment, the P-CSCF acquiring the number information of the user may include that: the P-CSCF acquires alias group information of the user.

In an embodiment, the P-CSCF acquiring the alias group information of the user may include that: an S-CSCF sends a registration success response message carrying alias group indication information;

correspondingly, the P-CSCF parsing and storing the number information to realize number association may include that: after receiving the registration success response message, the P-CSCF parses the registration success response message and identifies the alias group indication information, and stores the acquired alias group information locally.

In an embodiment, the P-CSCF acquiring the alias group information of the user may include that: after the P-CSCF subscribes successfully, the S-CSCF sends a NOTIFY message carrying the alias group indication information;

correspondingly, the P-CSCF parsing and storing the number information to realize number association may include that: after receiving the NOTIFY message, the P-CSCF parses the NOTIFY message and identifies the alias group indication information, and stores the acquired alias group information locally.

In an embodiment, the P-CSCF acquiring the number information of the user may include that: a Business and Operations Support System (BOSS) sends a number association request including all the associated numbers;

correspondingly, the P-CSCF parsing and storing the number information to realize number association may include that: the P-CSCF receives and parses the number association request, and stores number association information of the user locally.

A system for realizing number association includes a P-CSCF; wherein the P-CSCF is configured to acquire number information of a user, parse and store the number information to realize number association.

In an embodiment, the P-CSCF is configured to acquire alias group information of the user.

In an embodiment, the system further may include an S-CSCF; wherein the S-CSCF is configured to send a registration success response message carrying alias group indication information;

the P-CSCF is configured to, after receiving the registration success response message, parse the registration success response message and identify the alias group indication information, and store the acquired alias group information locally.

In an embodiment, the system further may include an S-CSCF; wherein the S-CSCF is configured to, after the P-CSCF subscribes successfully, send a NOTIFY message carrying alias group indication information;

the P-CSCF is configured to, after receiving the NOTIFY message, parse the NOTIFY message and identify the alias group indication information, and store the acquired alias group information locally.

In an embodiment, the system further may include a BOSS, which is configured to send a number association request including all the associated numbers;

the P-CSCF is configured to receive and parse the number association request, and store number association information of the user locally.

With the method that a P-CSCF acquires number information of a user, and then parses and stores the number information, number association is realized, wherein the format of the number may be either SIP or TEL. The disclosure can simplify and optimize service processing, thus improving efficiency and reducing realization cost.

DETAILED DESCRIPTION

In an embodiment of the disclosure, a P-CSCF acquires number information of a user, and the P-CSCF parses and stores the number information to realize number association.

For making the purpose, the technical solutions and the advantages of the disclosure more clear, the disclosure is elaborated below with reference to the embodiments and the accompanying drawings.

Figure 1:
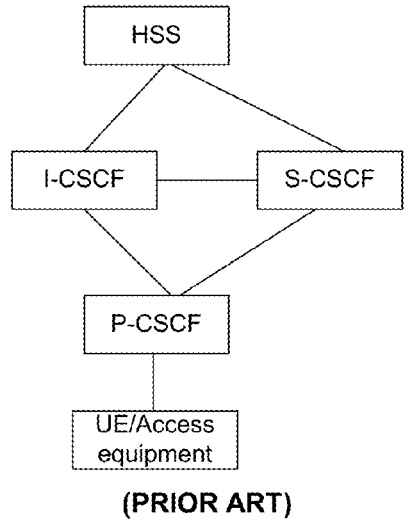
FIG. 1 is a network architecture diagram of an existing IMS.
Figure 2:
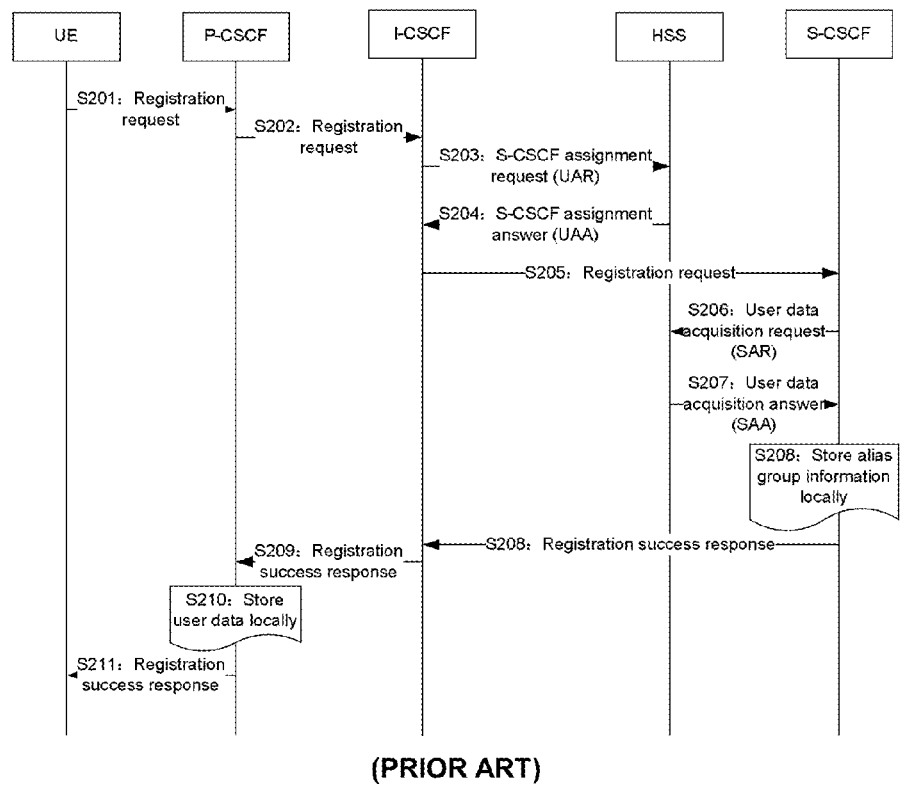
FIG. 2 is a flowchart illustrating that an S-CSCF acquires alias group information in the existing IMS.
Figure 3:
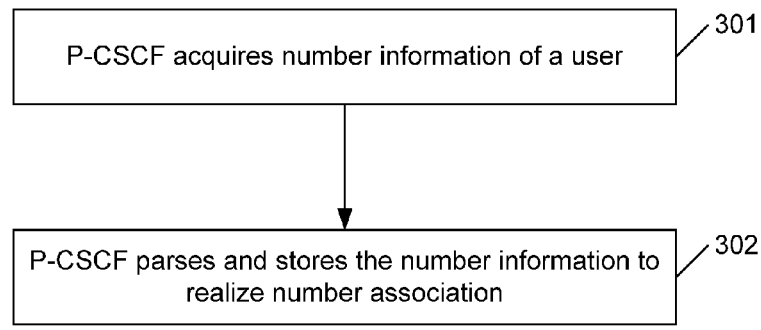
FIG. 3 is a flowchart of a method for realizing number association in an embodiment of the disclosure.

FIG. 3 shows a flow of a method for realizing number association in an embodiment of the disclosure; as shown in FIG. 3, the method includes the following steps:

Step 301: a P-CSCF acquires number information of a user;

specifically, the number information of the user that the P-CSCF acquires can be alias group information of the user; the P-CSCF can acquire the alias group information of the user by the following ways:

an S-CSCF sends a registration success response message carrying alias group indication information; specifically, the S-CSCF constructs the registration success response message which carries the alias group indication information through an extended parameter in the registration success response message; here, the extended parameter meets the requirement of the SIP; specifically, the extended parameter can be a P-Associated-URI head extended parameter of the registration success response message; extended SIP indication information can be "alias", that is, the numbers of the same alias group have the same "alias" indication; or, after the P-CSCF subscribes successfully, the S-CSCF sends a NOTIFY message carrying the alias group indication information; specifically, the S-CSCF constructs a NOTIFY request; the XML package of the NOTIFY request includes subscribed related information, and the alias group indication information is carried in the NOTIFY message by extending XML; the S-CSCF sends the constructed NOTIFY request to the P-CSCF; or, a Business & Operation Support System (BOSS) sends a number association request including all the associated numbers; specifically, the BOSS sends a number association request to the P-CSCF, and all the associated numbers are stored in the number association request;

Step 302: the P-CSCF parses and stores the number information to realize number association;

specifically, after receiving the registration success response message, the P-CSCF parses the registration success response message and identifies the alias group indication information, and stores the acquired alias group information locally, wherein the alias group indication information is for indicating the alias group information, specifically through the extended parameter in the registration success response message; or, after receiving the NOTIFY message, the P-CSCF parses the NOTIFY message and identifies the alias group indication information, and stores the acquired alias group information locally; or, the P-CSCF receives and parses the number association request, and stores the number association information of the user locally; preferably, the P-CSCF can also return a number association execution response to the BOSS.

Figure 4:
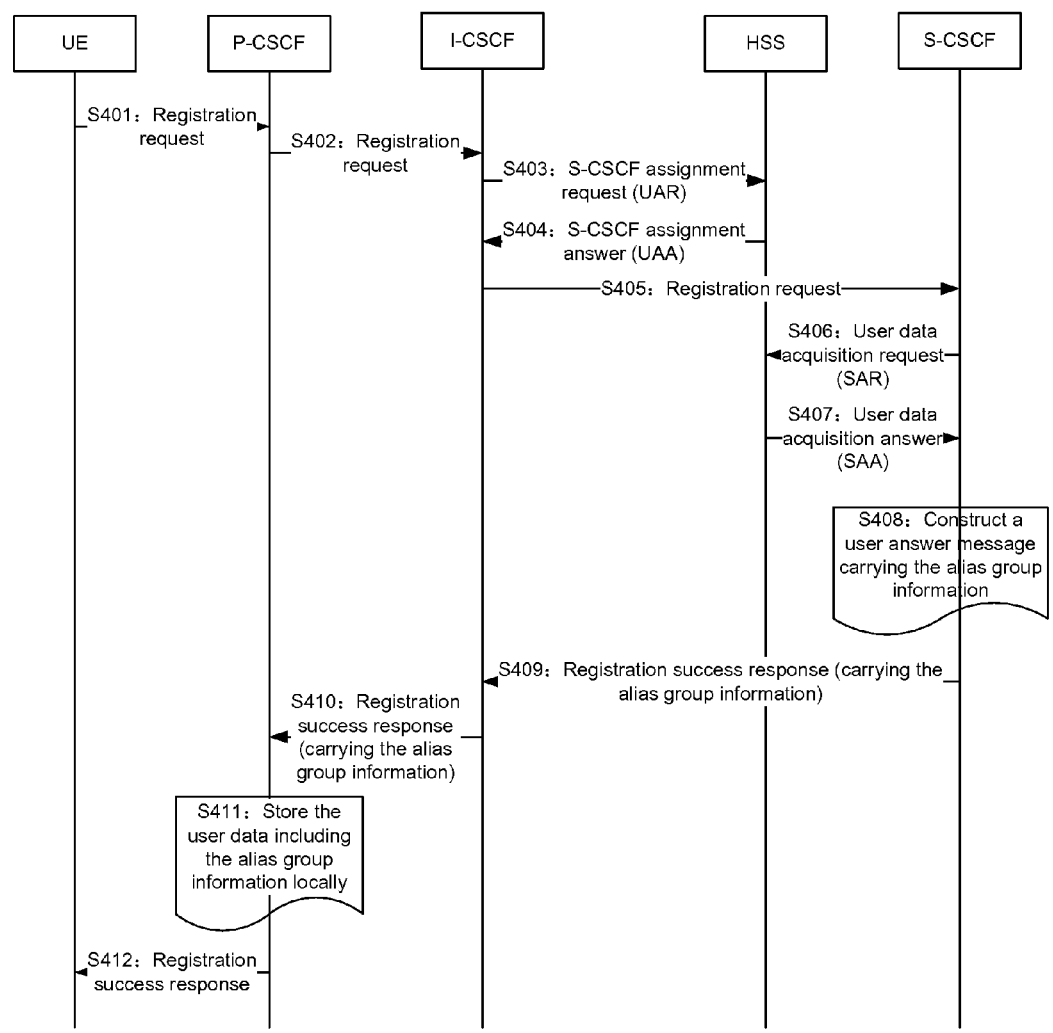
FIG. 4 is a flowchart of a first embodiment of the method for realizing number association in the disclosure.

FIG. 4 shows a flowchart of a first embodiment of the method for realizing number association in the disclosure; as shown in FIG. 4, the first embodiment is realization of acquisition of the alias group information by a P-CSCF in an IMS through a registration response. By using the alias group technology, the alias group information on an S-CSCF is transmitted to the P-CSCF through a registration success response message; then, the P-CSCF parses and stores the alias group information locally to realize number association. Specifically, the flow includes the following steps:

S401: UE sends a registration request to a P-CSCF, wherein the registration request carries a PUI;

S402: when receiving the registration request, the P-CSCF locates local user data; the P-CSCF finds an I-CSCF by a DNS or other ways, and forwards the registration request to the I-CSCF;

S403: the I-CSCF sends an S-CSCF assignment request (UAR) to the HSS to require assigning an S-CSCF;

S404: the HSS returns an S-CSCF assignment answer (UAA) to the I-CSCF, wherein the S-CSCF assignment answer includes an S-CSCF address or name assigned to the user, and the user data including alias group information of the user;

S405: the I-CSCF sends a registration request message to the selected S-CSCF;

S406: the S-CSCF sends a user data acquisition request (SAR) to the HSS to acquire user data;

S407: the HSS returns a user data acquisition answer (SAA) carrying the user data, wherein the user data includes the alias group information of the user;

S408: the S-CSCF parses and stores the user data including the alias group information of the user; at the same time, the S-CSCF constructs a registration success response message, like 200OK; the alias group information of the user is carried in the response message through an extended SIP parameter; for example, in P-Associated-URI, an extended SIP indicates "alias", that is, the numbers of the same alias group have the same "alias" indication;

S409: the S-CSCF forwards the registration success response (200OK) to the I-CSCF, wherein the extended alias group indication information can be transmitted transparently;

S410: the I-CSCF forwards the registration success response to the P-CSCF; the extended alias group indication information can be transmitted transparently;

S411: after receiving the registration response, the P-CSCF can parse it exactly, acquires the alias group information of the user and stores it locally, so that number association is realized; and S412: the P-CSCF forwards the registration success response to the UE.

Figure 5:
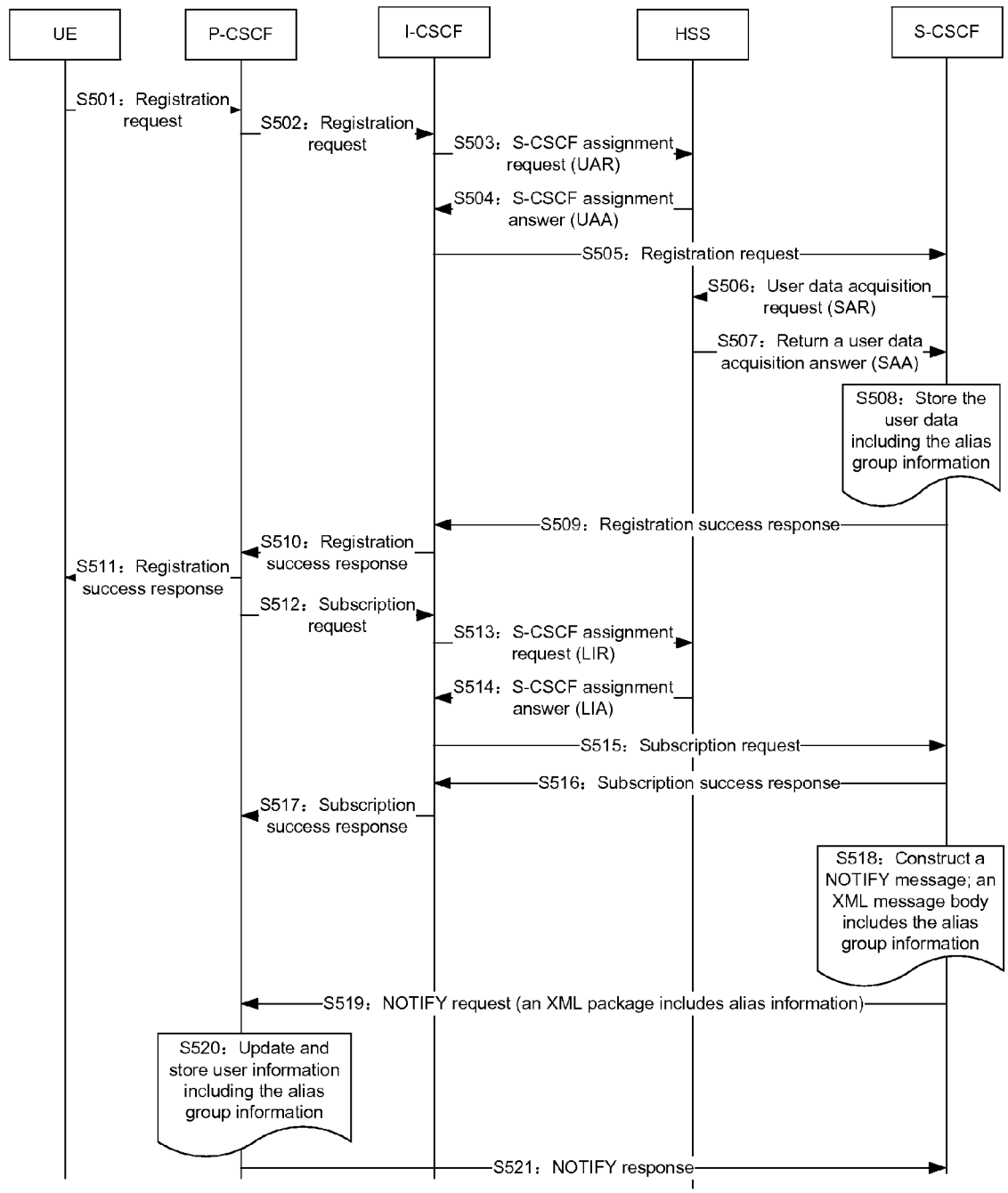
FIG. 5 is a flowchart of a second embodiment of the method for realizing number association in the disclosure.

FIG. 5 shows an implementation flow of a second embodiment of the method for realizing number association in the disclosure; as shown in FIG. 5, the second embodiment is realization of acquisition of the alias group information by the P-CSCF in the IMS through a subscription NOTIFY message sent by the S-CSCF. By using the alias group technology, the alias group information on the S-CSCF is transmitted, in the NOTIFY message sent to the P-CSCF by the S-CSCF, to the P-CSCF through a registration state subscription; then, the P-CSCF parses and stores the alias group information locally to realize number association. Specifically, the flow includes the following steps:

S501: UE sends a registration request to a P-CSCF, wherein the registration request carries a PUI;

S502: when receiving the registration request, the P-CSCF finds an I-CSCF by a DNS or other ways, and forwards the registration request to the I-CSCF;

S503: the I-CSCF sends an S-CSCF assignment request (UAR) to an HSS to require assigning an S-CSCF;

S504: the HSS returns an S-CSCF assignment answer (UAA) to the I-CSCF, wherein the S-CSCF assignment answer includes an S-CSCF address or name assigned to a user;

S505: the I-CSCF sends a registration request to the selected S-CSCF;

S506: after receiving the registration request, the S-CSCF sends a user data acquisition request (SAR) to the HSS;

S507: the HSS returns a user data acquisition answer (SAA) to the S-CSCF, wherein alias group information of the user can be indicated through a tAliasIdentityGroupID field;

S508: after receiving a user data acquisition response from the HSS, the S-CSCF stores the user data locally, wherein the user data includes the alias group information of the user;

S509: the S-CSCF returns a registration success response, like 200OK, to the I-CSCF;

S510: the I-CSCF forwards the registration success response to the P-CSCF;

S511: the P-CSCF forwards the registration success response to the UE;

S512: the P-CSCF sends a registration state request to the I-CSCF, the user is the P-CSCF, and the one subscribed is a new registering user;

S513: the I-CSCF sends an S-CSCF assignment request (LIR) to the HSS;

S514: the HSS returns an S-CSCF assignment answer (LIA) to the I-CSCF;

S515: the I-CSCF sends a subscription request message to the selected S-CSCF;

S516: after checking validity of the user and the one subscribed, the S-CSCF returns a subscription success response, like 200OK;

S517: the I-CSCF forwards the subscription success response to the P-CSCF;

S518: the S-CSCF constructs a NOTIFY request message, the XML package of the NOTIFY message body includes registration state information of the one subscribed; the alias group information of the user is indicated through an extended XML tag; for example, alias information can be marked through an alias parameter in AOR, and the specific example can refer to the following:

```
<?xml version="1.0"?>
    <reginfo xmlns="urn:ietf:params:xml:ns:reginfo"
xmlns:cp="urn:ietf:params:xml:ns:common-policy"
            xmlns:eri="urn:3gpp:ns:extRegInfo:1.0"
            version="0" state="full">
        <registration aor="sip:user1_public1@home1.net"
        id="as9"
                state="active" alias="abc">
        <contact id="76" state="active" event="registered">
            <uri>sip:[5555::aaa:bbb:ccc:ddd]</uri>
            <unknown-param name="audio"/>
        </contact>
    </registration>
    <registration aor="sip:user1_public2@home1.net"
    id="as10"
            state="active" alias="abc">
        <contact id="86" state="active" event="created">
            <uri>sip:[5555::aaa:bbb:ccc:ddd]</uri>
            <unknown-param name="audio"/>
        </contact>
        <cp:actions>
            <eri:rph ns="wps" val="1"/>
            <eri:privSender/>
        </cp:actions>
    </registration>
</reginfo>
```

S519: the S-CSCF sends a NOTIFY request to the P-CSCF;

S520: after receiving the NOTIFY request, the P-CSCF parses the NOTIFY message body, acquires registration state information of the user, which includes the alias group information of the user in the message body, and stores the registration state information locally, so that number association is realized; and S521: the P-CSCF sends a NOTIFY request success response, like 200OK, to the S-CSCF.

Figure 6:
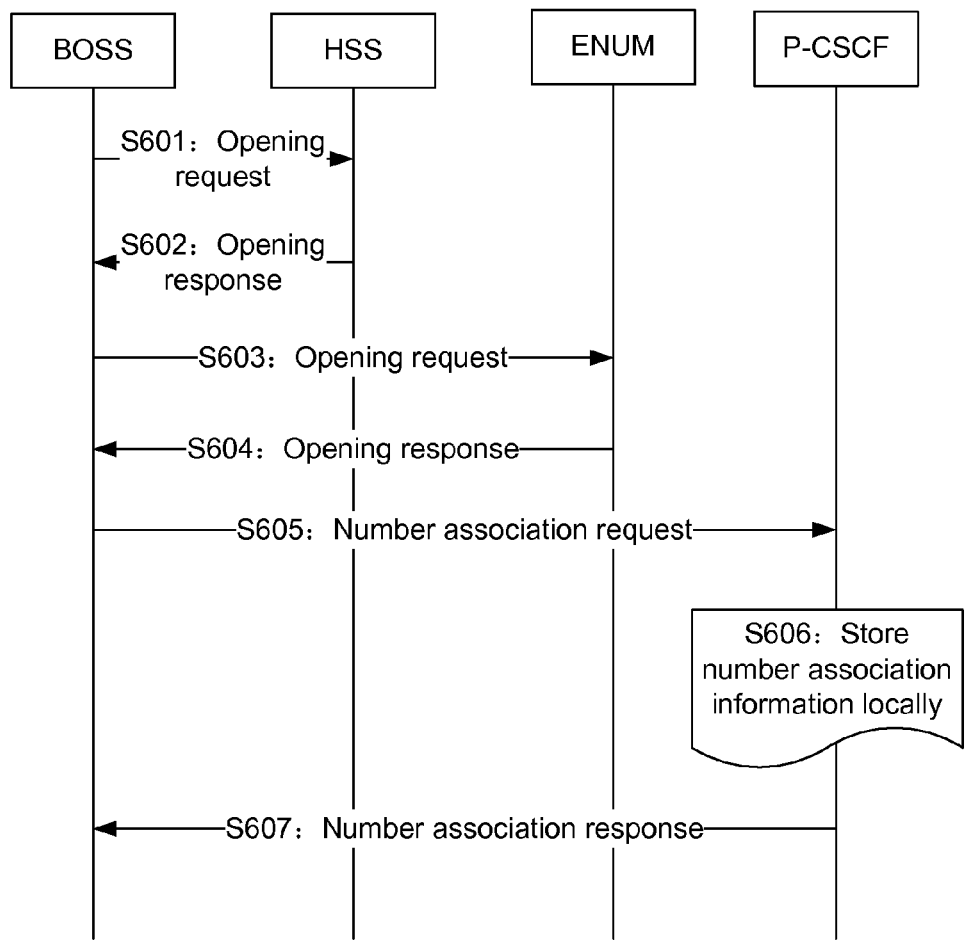
FIG. 6 is a flowchart of a third embodiment of the method for realizing number association in the disclosure.

FIG. 6 shows an implementation flow of a third embodiment of the method for realizing number association in the disclosure; as shown in FIG. 6, the third embodiment is realization of acquisition of the number association information through the BOSS by the P-CSCF in the IMS; a number association request is sent to the P-CSCF network element through the BOSS, and after the P-CSCF parses and stores the number association request, number association is completed. Specifically, the flow includes the following steps:

S601: when an IMS user desires to open a service, the BOSS sends an opening request to the HSS;

S602: the HSS returns an opening response after processing the opening request;

S603: when the IMS user desires to open the service, the BOSS needs to send an opening request to an E.164 number server (ENUM);

S604: the ENUM returns an opening response after processing the opening request;

S605: the BOSS sends a number association request to the P-CSCF, wherein the number association request can either extend a new interface or utilize an existing interface to extend parameters, so as to send the number association request;

wherein the number association request includes all the associated numbers;

S606: after receiving the number association request, the P-CSCF stores number association information locally to realize number association; and S607: after processing, the P-CSCF sends a number association response message.

Figure 7:
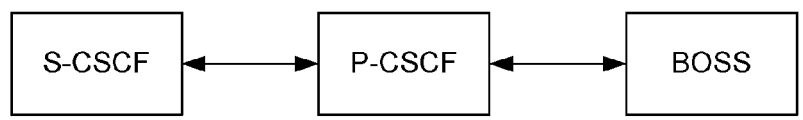
FIG. 7 is a structural diagram of a system for realizing number association in an embodiment of the disclosure.

FIG. 7 shows a structure of a system for realizing number association in the disclosure; as shown in FIG. 7, the system includes a P-CSCF; wherein the P-CSCF is configured to acquire number information of a user, parse and store the number information to realize number association;

wherein the P-CSCF is specifically configured to acquire alias group information of the user.

Preferably, the system further includes an S-CSCF; wherein the S-CSCF is configured to send a registration success response message carrying the alias group indication information;

the P-CSCF is configured to, after receiving the registration success response message, parse the registration success response message and identify the alias group indication information, and store the acquired alias group information locally.

Preferably, the S-CSCF is further configured to, after the P-CSCF subscribes successfully, send a NOTIFY message carrying the alias group indication information;

the P-CSCF is configured to, after receiving the NOTIFY message, parse the NOTIFY message and identify the alias group indication information, and store the acquired alias group information locally.

Preferably, the system further includes a BOSS, which is configured to send a number association request including all the associated numbers;

the P-CSCF is configured to receive and parse the number association request, and store the number association information of the user locally.

The method of the disclosure enables a P-CSCF to know, after acquiring an association relationship among user numbers, which PUIs are associated with each other. Maybe two PUIs are associated with each other, or multiple PUIs are associated with each other. The form of the PUI may be either an SIP format or a TEL format, which enables the P-CSCF to realize number association, so as to simplify and optimize some service processing; for example, during monitoring, all the associated numbers can be monitored based on the number association information by monitoring only one number.

The above are only the embodiments of the disclosure, and not intended to limit the scope of the claims of the disclosure.

What is claimed is:

1. A method for realizing number association, comprising:
acquiring, by a Proxy Call Session Control Function (P-CSCF), number information of a user; and
parsing and storing, by the P-CSCF, the number information;
monitoring, by the P-CSCF, all the associated numbers based on the number information;
wherein acquiring, by the P-CSCF, the number information of the user comprises:
acquiring, by the P-CSCF, alias group information of the user;
wherein acquiring, by the P-CSCF, the alias group information of the user comprises: sending, by a Serving Call Session Control Function (S-CSCF), a registration success response message carrying alias group indication information;
correspondingly, parsing and storing, by the P-CSCF, the number information comprises: after the P-CSCF receives the registration success response message, parsing, by the P-CSCF, the registration success response message and identifying the alias group indication information, and then storing the acquired alias group information locally;
or
wherein acquiring, by the P-CSCF, the alias group information of the user comprises: after the P-CSCF subscribes successfully, sending, by the S-CSCF, a NOTIFY message carrying alias group indication information;
correspondingly, parsing and storing, by the P-CSCF, the number information comprises: after the P-CSCF receives the NOTIFY message, parsing, by the P-CSCF, the NOTIFY message and identifying the alias group indication information, and storing the acquired alias group information locally.

2. A method for realizing number association, comprising:
acquiring, by a Proxy Call Session Control Function (P-CSCF), number information of a user; and
parsing and storing, by the P-CSCF, the number information;
wherein acquiring, by the P-CSCF, the number information of the user comprises: sending, by a Business and Operations Support System (BOSS), a number association request comprising all associated numbers;
correspondingly, parsing and storing, by the P-CSCF, the number information comprises: receiving and parsing, by the P-CSCF, the number association request, and storing number association information of the user locally.

3. A system for realizing number association, comprising a Proxy Call Session Control Function (P-CSCF); wherein
the P-CSCF is configured to acquire number information of a user, parse and store the number information;
wherein the P-CSCF is configured to acquire alias group information of the user;
further comprising a Serving Call Session Control Function (S-CSCF); wherein the S-CSCF is configured to send a registration success response message carrying alias wow indication information;
the P-CSCF is configured to, after receiving the registration success response message, parse the registration success response message and identify the alias group indication information, and store the acquired alias group information locally;
or
further comprising an S-CSCF; wherein
the S-CSCF is configured to, after the P-CSCF subscribes successfully, send a NOTIFY message carrying alias group indication information; the P-CSCF is configured to, after receiving the NOTIFY message, parse the NOTIFY message and identify the alias group indication information, and store the acquired alias group information locally.

4. A system for realizing number association, comprising a Proxy Call Session Control Function (P-CSCF); wherein the P-CSCF is configured to acquire number information of a user, parse and store the number information;
further comprising a Business and Operations Support System (BOSS), which is configured to send a number association request comprising all associated numbers;
the P-CSCF is configured to receive and parse the number association request, and store number association information of the user locally.

* * * * *